United States Patent
Strickroth

(10) Patent No.: US 8,535,631 B2
(45) Date of Patent: Sep. 17, 2013

(54) METHOD FOR THE CATALYTIC REMOVAL OF CARBON DIOXIDE AND SULPHUR DIOXIDE FROM EXHAUST GASES

(75) Inventor: Alain Strickroth, Esch/Alzette (LU)

(73) Assignee: CPPE Carbon Process & Plant Engineering S.A., Luxembourg-Dommeldange (LU)

(*) Notice: Subject to any disclaimer, the term of this patent is extended or adjusted under 35 U.S.C. 154(b) by 0 days.

(21) Appl. No.: 13/696,757

(22) PCT Filed: May 6, 2011

(86) PCT No.: PCT/EP2011/057271
§ 371 (c)(1),
(2), (4) Date: Jan. 8, 2013

(87) PCT Pub. No.: WO2011/138425
PCT Pub. Date: Nov. 10, 2011

(65) Prior Publication Data
US 2013/0108533 A1    May 2, 2013

(30) Foreign Application Priority Data
May 7, 2010  (LU) ............................. 91685

(51) Int. Cl.
*B01D 53/50* (2006.01)
*B01D 53/62* (2006.01)

(52) U.S. Cl.
USPC .. 423/220; 423/230; 423/244.01; 423/244.03

(58) Field of Classification Search
USPC .............. 423/220, 230, 244.01, 244.03
See application file for complete search history.

(56) References Cited

U.S. PATENT DOCUMENTS

| | | | | |
|---|---|---|---|---|
| 3,862,295 A | * | 1/1975 | Tolles | 423/244.03 |
| 4,259,304 A | * | 3/1981 | Steiner | 423/244.03 |
| 4,477,426 A | * | 10/1984 | Raskin | 423/569 |
| 6,114,273 A | * | 9/2000 | Hayden | 502/180 |

FOREIGN PATENT DOCUMENTS

| | | |
|---|---|---|
| EP | 0779100 A1 | 6/1997 |
| JP | 4063115 A | 2/1992 |
| KR | 1020050028624 A | 3/2003 |
| WO | 2004/098740 A2 | 11/2004 |
| WO | 2005/108297 A2 | 11/2005 |
| WO | 2010/027335 A1 | 3/2010 |

* cited by examiner

*Primary Examiner* — Timothy Vanoy
(74) *Attorney, Agent, or Firm* — Tarolli, Sundheim, Covell & Tummino LLP

(57) ABSTRACT

A method for the catalytic removal of sulphur dioxide and carbon dioxide from waste gases in a reactor charged with an activated carbon catalyst, includes saturating the activated carbon with $SO_2$, saturating or partially saturating waste gases with water, introducing the waste gases with water, introducing the exhaust gases into the reactor catal ticall convertin the $SO_2$ into $H_2SO_4$ and $CO_2$ into C and $O_2$ and into sulphur-carbon compounds on the same catalyst, washing out the catalyst and discharging the $H_2SO_4$ as a liquid and the C as a solid and/or bound to sulphur compounds.

9 Claims, 5 Drawing Sheets

METHOD FOR THE CATALYTIC REMOVAL OF CARBON DIOXIDE AND SULPHUR DIOXIDE FROM EXHAUST GASES

This application is a National Phase Filing of PCT/EP2011/057271, filed May 6, 2011, which claims priority from Luxembourg Application No. 91 685, filed May 7, 2010, the subject matter of which are incorporated herein by reference in their entirety.

TECHNICAL FIELD

The present invention relates generally to a method for the catalytic removal of carbon dioxide and sulphur dioxide from waste gases.

PRIOR ART

Discussions on climate change have clearly demonstrated to mankind that the resources available to us are limited and that the harmful substances produced by human activities have a major impact on the environment and lead to long-term climate change. After sulphur emissions took centre stage in the 1960s, carbon dioxide emissions have now become the key topic. Intensive research has been being carried out for some years now to find ways in which the production of this gas can be avoided where possible or else ways in which this gas can be removed from the atmosphere. With regard to the latter option various methods have been proposed for binding the carbon dioxide from the atmosphere to solids or liquids and then storing it. Such methods are known, for example, from WO2005108297A, KR200502862 A and WO2004098740 A. It has also been attempted to reduce the carbon dioxide electrochemically, in which case the electric energy can be obtained from solar energy in an environmentally friendly manner, as described in JP4063115 A.

However, these methods have the drawback that they either only relocate the problem or else are very energy intensive.

OBJECT OF THE INVENTION

An object of the present invention is to provide a method which removes the carbon dioxide from waste gases.

GENERAL DESCRIPTION OF THE INVENTION

This object is achieved in accordance with the invention by a method for the catalytic removal of carbon dioxide and sulphur dioxide from waste gases in a reactor charged with an activated carbon catalyst, characterised by the following steps:
  saturating the activated carbon with $SO_2$,
  saturating or partially saturating the waste gases with water,
  introducing the exhaust gases into the reactor,
  catalytically converting the $SO_2$ into $H_2SO_4$ and, in parallel with this, catalytically converting $CO_2$ into C and $O_2$ on the same catalyst and/or adding C to sulphur compounds,
  washing out the catalyst and discharging the $H_2SO_4$ as a liquid and the C as a solid or/and bound to sulphur compounds.

One advantage of the method is that the reaction products $H_2SO_4$ and C are separated from the gas phase of the waste gases and are present once the method is complete as a liquid ($H_2SO_4$) and as a solid (C or C on sulphur compounds) and can be used further.

The method makes it possible to treat waste gases from industrial plants which contain carbon dioxide and $SO_2$ and to remove both harmful substances at the same time and in parallel, i.e. in a single method, either completely or to a considerable extent from the waste gases.

In the method at least 40% of the $CO_2$ contained in the waste gases is converted, preferably at least 50%, particularly preferably at least 60% and in particular at least 82%.

Sulphur-carbon compounds are understood in the context of the present invention to mean compounds which contain both sulphur and carbon, irrespective of the number, the oxidation state and the presence of other elements.

The expression "saturation of the activated carbon with $SO_2/SO_3$," is to be understood in the context of the present invention to mean that the activated carbon catalyst has sufficient exothermic conversion energy, which is produced by the $SO_2/SO_3/H_2SO_4$ conversion, to commence $CO_2$ conversion subsequently. As emerged from our tests, this corresponds to approximately of 20-50 kg of $SO_2/m^3$ of catalyst.

The expression "saturation of the waste gases with water" is to be understood in the context of the present invention to mean an introduction of very fine water droplets into the flue gas, reducing the temperature and increasing the water content until a relative atmospheric humidity of a maximum of 100% is produced in the flue gas. This saturation of the waste gases with water is preferably carried out in a quench cooler or injection cooler. The pH of this water may be neutral, alkaline or acidic. The pH of the water used to saturate the waste gases is preferably between 3 and 11 and particularly preferably between 5 and 9.

This method is somewhat similar to the SULFACID process, which refers to a process, in which $SO_2$ is converted into $H_2SO_4$ on an activated carbon catalyst. However, in this method the carbon dioxide is not converted into carbon and oxygen or into sulphur-carbon compounds, since in this method the exothermic energy produced during the conversion of $SO_2$ via $SO_3$ to form $H_2SO_4$ is supplied almost completely to the aqueous covering in the catalyst bed.

From the tests which were carried out in conjunction with the research which led to this invention it was established that no separation of $CO_2$ was observed, either in the tests or in the industrial applications, in any of the possible conventional ways of carrying out SULFACID methods since in this case the exothermic energy which is produced during the conversion of $SO_2$ via $SO_3$ to form $H_2SO_4$ is supplied to the aqueous covering in the bed so as to produce the aforementioned $H_2SO_4$.

Waste gases in which the ratio of $CO_2$ to $SO_2$ is between 0.25 mol/mol and 0.58 mol/mol are preferentially treated. Of course it is also possible to treat waste gases in which the ratio of the two harmful substances lies outside this range. In this instance however the harmful substance which lies above the aforementioned limit is not completely removed from the waste gases, but is only removed in part.

The inlet temperatures of the waste gases preferably lie between the ambient temperature and 150° C. Higher temperatures in continuous operation could permanently damage the catalyst.

The oxygen content of the waste gases is not actually critical, but should ideally be at least 5% by volume. The $O_2$ content should preferably be more than 8 times greater than the $SO_2$ content The waste gases may be saturated quite easily with water by quenching or a similar method. The waste gases should naturally contain as little solids, dust and the like as possible in order to prevent intoxication and clogging of the catalyst.

This dedusting of the waste gases is carried out by conventional filtering before the waste gases are then fed into the quencher.

The $SO_2$ purifying factor for the exhaust gases preferably lies between 0.4 and 0.6 with the aid of the catalyst. Between 40% and 60% of the $SO_2$ is thus converted via $SO_3$ into $H_2SO_4$; the rest of the $SO_2/SO_3$ reacts to form sulphur-carbon compounds and is discharged into the exhaust air in the form of $SO_2/SO_3$. Example: with 100% separation of $SO_2$ in the $CO_2$ process this corresponds to a conversion of 40-60% into $H_2SO_4$ and a 60-40% conversion into sulphur-carbon compounds (with an overload of $SO_2/SO_3$ there is thus no longer a 40-60% conversion into $H_2SO_4$, and the excess is discharged into the exhaust air in the form of $SO_2/SO_3$—in this case the $CO_2$ separation is also reduced or halted). In the SULFACID process there is a 70-90% conversion into $H_2SO_4$ with 100% separation of $SO_2$ and an approximately 30-10% release of $SO_2/SO_3$ into the exhaust air. With an overload of $SO_2/SO_3$ in the SULFACID process the 70-90% conversion into $H_2SO_4$ is not increased, but instead the excess again re-enters the exhaust gases in the form of $SO_2/SO_3$.

Therefore, in the method according to the invention, with large volume flows and/or high concentrations of $SO_2/SO_3/CO_2$, a plurality of reactors can be connected in parallel and/or in series in order to achieve required values.

BRIEF DESCRIPTION OF THE FIGURES

Further details and advantages of the invention can be taken from the following detailed description of a possible embodiment of the invention on the basis of the accompanying FIG. 1. In the drawings.

DESCRIPTION OF AN EMBODIMENT OF THE INVENTION

Figure 1:
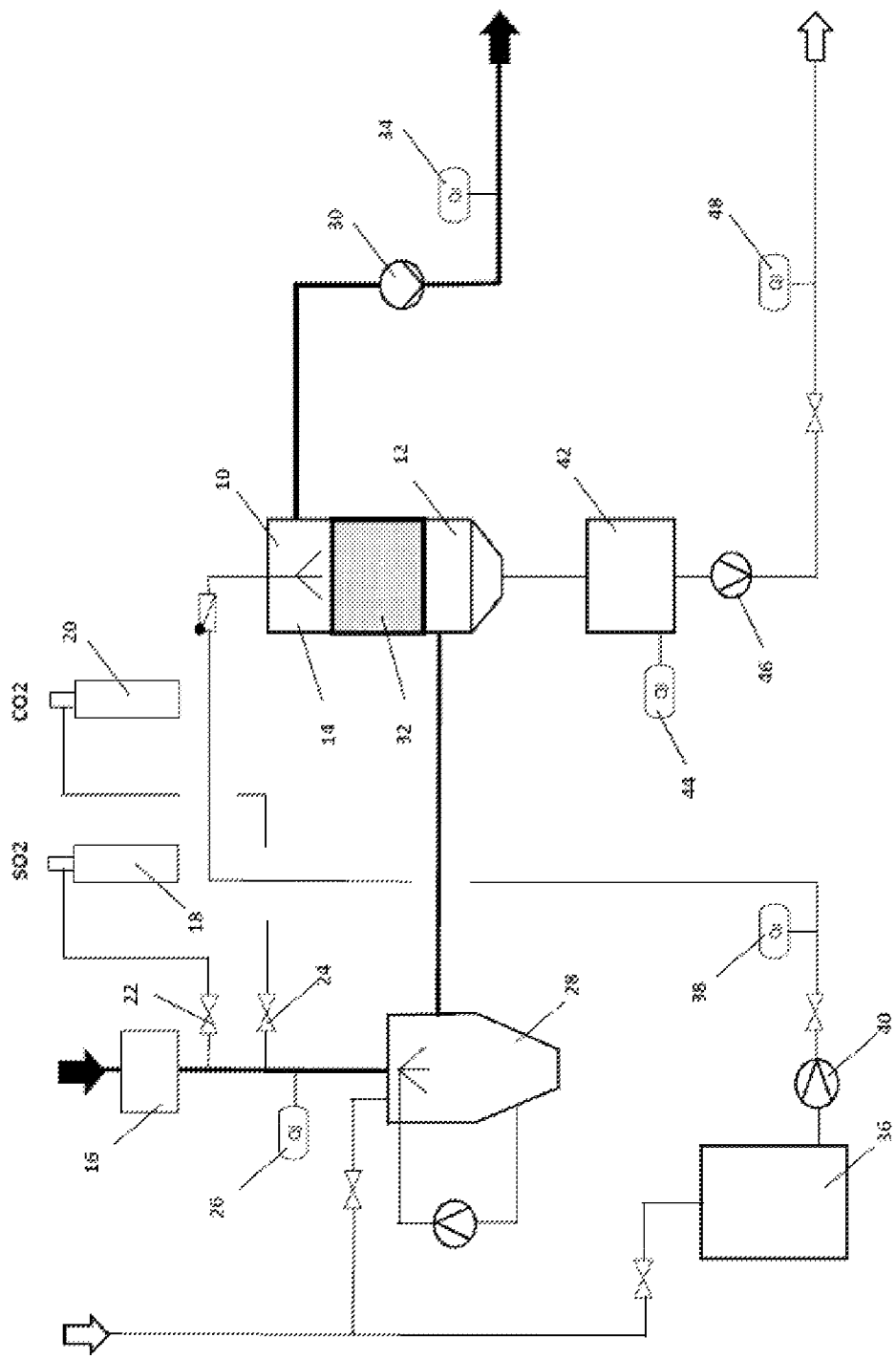
FIG. 1 is a schematic view of the arrangement.
Figure 2:
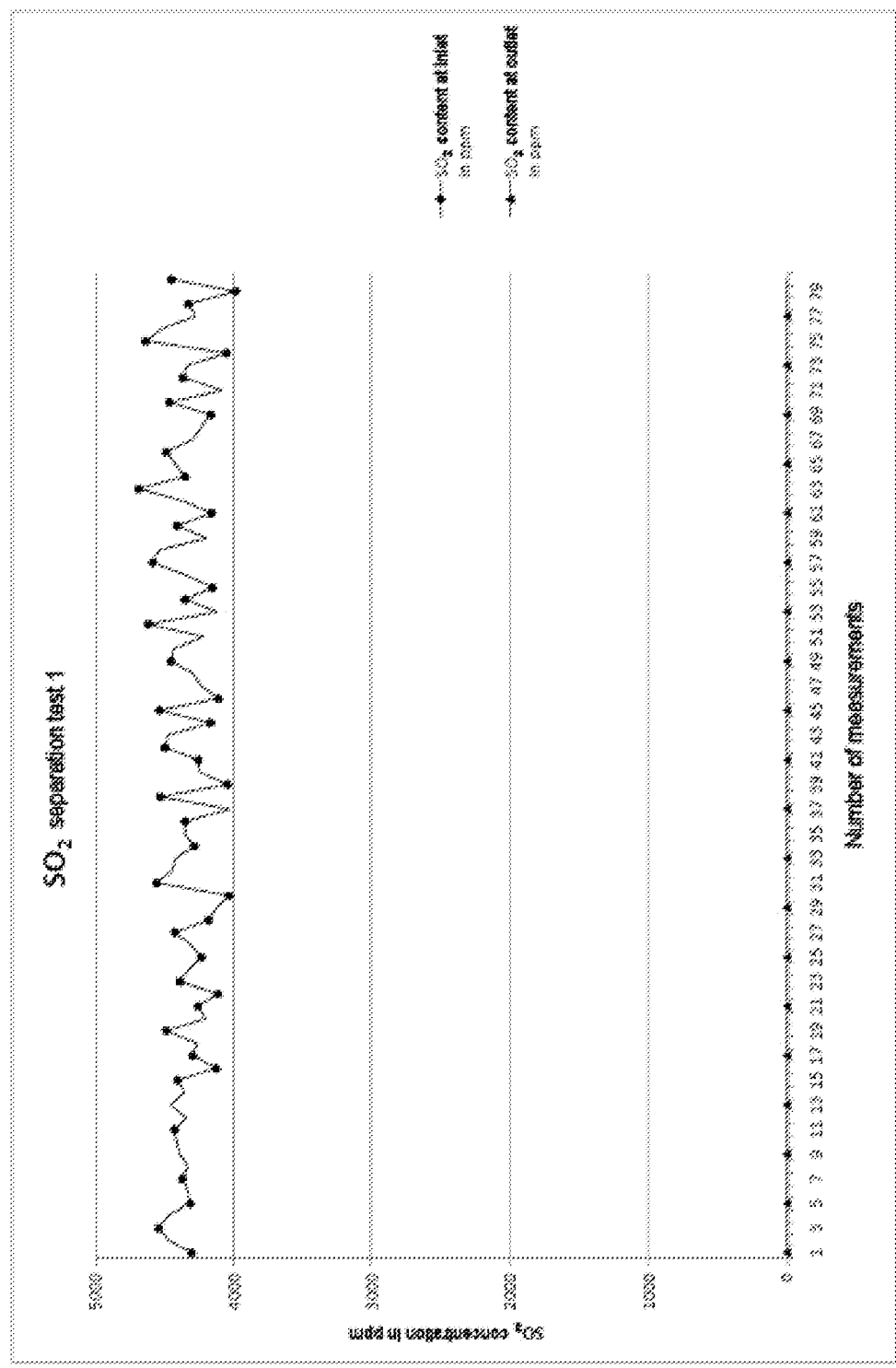
FIG. 2 is a graph showing the values measured during Test 1 of the $SO_2$ content of the waste gases at the inlet and outlet of the reactor.

The test arrangement shown in FIG. 1 in order to illustrate the invention comprises a test reactor 10, to the lower part 12 of which a test gas is supplied and in the upper part 14 of which water is sprayed.

The test gas which was used to simulate the waste gases consists of ambient air which is heated in a heating device 16 to approximately 80° C. and to which $SO_2$ is subsequently added from a first pressurised cylinder 18 as well as $CO_2$ from a second pressurised cylinder 20 via corresponding valves 22, 24. A first measuring device 26 analyses the composition ($SO_2$ content, $CO_2$ content, $O_2$ content), the temperature, the flow volume and the flow rate of the test gas.

The test gas is then cooled to saturation temperature in a quencher 28 by evaporation of water. The test gas is drawn via the quencher 28 into the test reactor 10 by a waste gas fan 30. A mist collector at the outlet of the quencher 28 collects the spray.

The test gas flows through the test reactor 10 and the activated carbon catalyst 32 arranged therein from bottom to top and is then examined once discharged from the test reactor 10 in a second measuring device 34 for the same parameters as in the first measuring device 26, i.e. composition ($SO_2$ content, $CO_2$ content, $O_2$ content), the temperature, the flow volume and the flow rate, and is then released into the atmosphere.

The water required in the process is fed from a storage container 36 via a metering device 38, where the flow is measured, and a pump 40 into the upper part 14 of the test reactor 10, where the water flows through the activated carbon catalyst 32 in counterflow to the test gas. The water required for the quencher 28 comes directly from the water supply and is circulated within the cycle.

Alternatively however, the water required in the process can also be fed through the reactor in co-current flow with, i.e. in the same direction as, the test gas. The selection of a co-current or counterflow method depends for example on the local conditions.

The $SO_2$ is catalytically converted into $SO_3$ on the activated carbon catalyst, which is not additionally impregnated with metals, and is then converted into sulphuric acid if water is added. The packing materials are located beneath the molecular sieve and distribute the gas and may be doped. The sulphuric acid and the carbon and sulphur-carbon compounds formed are rinsed off by the activated carbon catalyst by intermittent spraying with water, as a function of the volume of the catalyst and of the $SO_2/SO_3$ concentration, in counterflow to the gas. In the pilot system, spraying was carried out 1-4 times/hour using an amount of water of 2-15 l/hour. The water is collected in a container 42 in the lower part 12 of the test reactor 10 together with the aqueous sulphuric acid solution produced during the process and the carbon and carbon-sulphur compounds suspended therein, and the acid content is determined by means of a measuring device 44. The sulphuric acid solution is then pumped off by a pump 46 and the flow volume is ascertained using a further measuring device 48.

In the system described the sulphur dioxide of the waste gases is catalytically converted via $SO_3$ on moist catalyst particles to form sulphuric acid, and carbon dioxide is cleaved at the same time or in parallel to form carbon and oxygen. However, some of the carbon is also absorbed in sulphur compounds.

The method was tested successfully under the following conditions:

water saturation of the waste gases before entry into the reactor by quenching.

$SO_2$ content of the flue gases between 300 ppm and 6000 ppm. In this instance it should be noted that in the ideal situation and with continuous operation only 174 to 3480 ppm of this $SO_2$ can be converted during the $CO_2$ conversion. The excess of $SO_2$ is in this case used for the $H_2SO_4$ acid formation or is released into the atmosphere in the form of $SO_2/SO_3$.

$CO_2$ content of the flue gases between 0.1% by volume (1000 ppm) and 15% by volume (150 000 ppm).

Gas temperature between 10 and 80° C.

$O_2$ content approximately 20% by volume.

Water saturation and cooling of the waste gases by quenching.

Tested catalysts were provided by NORIT Nederland B.V. of Postbus 105 NL-3800 AC Amersfoot under the names Norit_PK1-3, Norit_PK_2-4 and Norit_PK_3-5.

These catalysts are an activated carbon granulate with a particle size between 1-3 mm, 2-4 mm or 3-5 mm and produced by steam activation. The following general properties are guaranteed by the manufacturer: iodine number 800; methylene blue adsorption 11 g/100 g; inner surface (BET) 875 m²/g; bulk density 260 kg/m³; density after back-wash 230 kg/m³; uniformity factor 1.3-ash content 7% by weight; pH alkaline; moisture (packed) 2% by weight.

In the tests flue gas analysis devices of the Testo brand were used. The devices are of the newest generation (year of manufacture 2009) and were calibrated by the manufacturer. In addition, the analysis data of these flue gas analysis devices was confirmed by wet-chemical measurements carried out in parallel. The results of all measurements fell within the admissible deviation tolerances.

The progression of the $SO_2$ conversion by $H_2SO_4$ on the catalyst surface corresponds to the following total formula:

$$SO_2 + \tfrac{1}{2}O_2 + nH_2O \text{ (catalytically)} \rightarrow H_2SO_4 + (n-1)H_2O$$

Without wanting to be committed to a particular theory, it is assumed that:

- $O_2$ and $SO_2$ migrate toward the active centres of the catalyst where they are converted into $SO_3$.
- $SO_3$ migrates out from the active centres of the catalyst and forms $H_2SO_4$ with the aqueous covering around the catalyst core.
- $SO_2$ reacts with oxygen and water to form sulphuric acid in accordance with the reaction equation above.
- The $CO_2$ molecule, which is of approximately the same size as a $SO_2$ molecule, is also transported into the pores of the catalyst core, where it is separated by the addition of energies of formation and is adsorbed on sulphur compounds. The concentrated sulphuric acid which forms in the aqueous cover around the core adsorbs the C portion of $CO_2$ and $O_2$ through high surface tensions (specific surface). 'Carbon-sulphur compounds' are thus produced.

The following reactions take place, inter alia:

$$CO_2 + SO_2 + H_2O \rightarrow C + H_2SO_4 + \tfrac{1}{2}O_2$$

$$H_2SO_4 + CO_2 \rightarrow SCO_3 + H_2O + O_2$$

- the C portion located on a sulphur compound is provided inside the sulphuric acid as a suspension,
- the formed carbon compounds are discharged in a suspension with the sulphuric acid from the catalyst by washing with water, thus diluting the sulphuric acid. The carbon compounds formed precipitate after a short period of time.

Softened or demineralised water can be used to wash out the catalyst.

It is assumed, without wanting to be committed to a particular theory, that the $CO_2$ is adsorbed using the thermal energy which is produced by the oxidation of $SO_2$ to form $SO_3$ and/or during the formation of the sulphuric acid ($SO_3$—$H_2SO_4$). The exothermic energy which is released during the oxidation is $\Delta HR = -98.77$ kJ/mol; for the sulphuric acid formation, this value is $\Delta HR = -123.23$ kJ/mol; a total exothermic energy of $\Delta HR$ total $= -231$ kJ/mol is thus available. The energy of $+394.4$ kJ/mol which is required for the conversion of $CO_2$ can be drawn from an exothermic reaction from $SO_2$ into $SO_3$, or can be drawn from the two exothermic reactions of $SO_2$ to $SO_3$ to $H_2SO_4$. This means that an exothermic energy between $-98.77$ kJ/mol and $-231$ kJ/mol is available.

Ideally, i.e. with no energy losses, it is accordingly possible to convert, during oxidation, 0.25 mol $CO_2$ to $SO_3$ per mol $SO_2$. However, acid is also produced, so in the ideal situation 0.58 mol $CO_2$ are converted per mol $SO_2$, or 0.39 kg $CO_2$ are converted per kg $SO_2$ and 1.53 kg $H_2SO_4$ are produced simultaneously. However, it should be noted that other reactions (can) also take place, as well as for example the above-described formation of sulphur-carbon compounds.

The above-mentioned reactions of $CO_2$ separation can only take place once a specific level of saturation with $SO_2$ has been achieved in the pores of the catalyst in respect of the sulphuric acid formation. This equilibrium occurs in the reactor once sufficient $SO_2$ has been converted into $SO_3$ and starts to form sulphuric acid. Such a condition is reached after approximately 20 to 100 operating hours depending on the approach adopted (amount of $SO_2/SO_3$ fed). This condition is independent of the percentage by weight of acid formation. For this reason, this process can also be carried out with different percentages by weight ($H_2SO4$) of acids. Example: with 100% separation of $SO_2$ in the $CO_2$ process, this corresponds to a conversion of 40-60% of $SO_2$ into $H_2SO_4$ and 60-40% of $SO_2$ into sulphur-carbon compounds.

Test 1
The tests were carried out under the following conditions:

| | | |
|---|---|---|
| Raw gas volume flow | min. | 200 m³/h |
| | max. | 300 m³/h |
| $CO_2$ content (inlet) | min. | 0.20% by volume |
| | max. | 1.50% by volume |
| $SO_2$ content (inlet) | min. | 300 ppm |
| | max. | 4,500 ppm |
| Waste gas temperature | min. | 10° C. |
| | max. | 12° C. |
| Dew-point temperature | saturated | |
| O2 content | | >20% by volume |

The reactor is made of glass fibre reinforced plastics material, has a volume of approximately 2 m³ and is filled with 1 m³ of an activated carbon catalyst of the Norit_PK_2-4 type.

Figure 3:
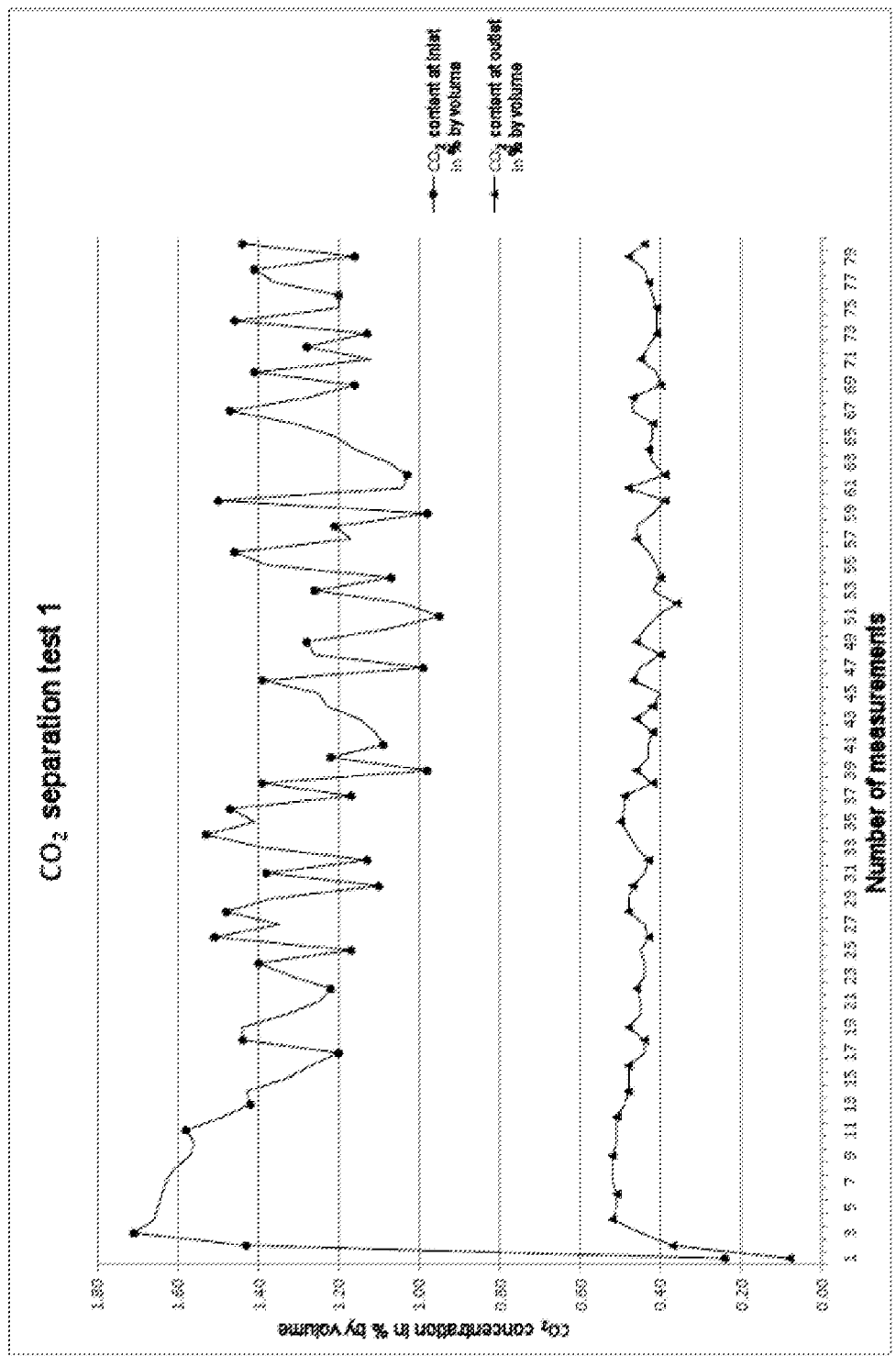
FIG. 3 is a graph showing the values measured during Test 1 of the $CO_2$ content of the waste gases at the inlet and outlet of the reactor.
Figure 4:
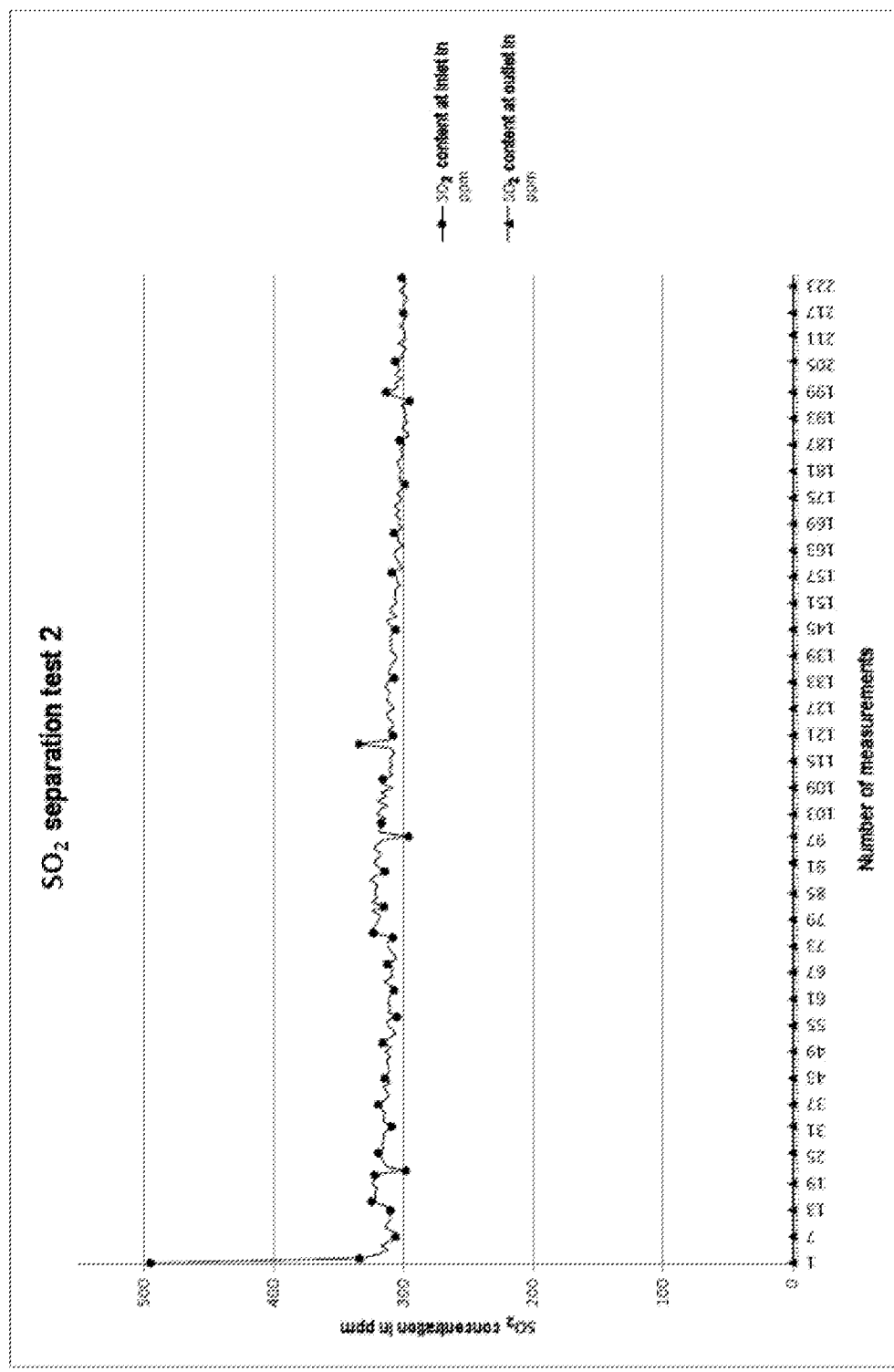
FIG. 4 is a graph showing the values measured during Test 2 of the $SO_2$ content of the waste gases at the inlet and outlet of the reactor.

In a first phase the test system was run for approximately 50 hours with the addition of $SO_2$ from gas cylinders, and in this instance between 3,000 and 4,000 ppm of $SO_2$ were added. Overall, the reactor was charged with approximately 45 kg of $SO_2$ (approximately 45 kg of $SO_2/m^3$ of catalyst). In accordance with this test, the addition of water at 2 to 15 l/hour was divided into 1 to 4 portions/hour. In this instance, in contrast to the SULFACID process, no significant concentration of sulphuric acid was observed (4-6% by weight). $CO_2$ was dedusted after approximately 40 hours (approximately 36 kg of $SO_2/m^3$ of catalyst). The $SO_2$ and $CO_2$ content of the waste gases was measured in each case at the inlet and at the outlet of the reactor, as illustrated in FIG. 1. The measurements were taken every 30 seconds and are shown in graphs in FIGS. 3 and 4. The first measurements shown in this case were taken after saturation of the catalyst, i.e. 40 hours after start-up of the reactor. The $CO_2$ concentration fluctuated repeatedly between 1.0% by volume and 1.55% by volume and it was established that the purifying values of $CO_2$ were on average less than 60%. The test was carried out continuously over approximately 40 minutes. Over this entire period the treated waste gases no longer contained any $SO_2$, as can be seen from FIG. 3.

If the activated carbon catalyst is overloaded with $SO_2$, the $CO_2$ may be converted only in part or even not at all. The amount of water should also not be added during the process since otherwise the conversion of $CO_2$ will be reduced in favour of $H_2SO_4$ conversion or increased $SO_2/SO_3$ will be released into the waste air. It should be noted that in the case of a conventional SULFACID process, much greater amounts of water are added. For example, in a comparative SULFACID process, approximately 8-10 litres would be added regularly every 15 minutes (32-40 l/hour/m³ of catalyst). By contrast, in the CO$_2$ process a maximum of 15 litres (generally 8 litres) are added every hour at irregular intervals.

| Test 2 | | | |
|---|---|---|---|
| Raw gas volume flow | min. | 200 | m³/h |
| | max. | 300 | m³/h |
| CO$_2$ content | min. | 0.30% | by volume |
| | max. | 1.00% | by volume |
| SO$_2$ content (inlet) | min. | 300 | ppm |
| | max. | 500 | ppm |
| Waste gas temperature | min. | 70° | C. |
| | max. | 80° | C. |
| Dew-point temperature | saturated | | |
| O2 content | | >20% | by volume |

The reactor is made of glass fibre reinforced plastics material, has a volume of approximately 2 m³ and is filled with 0.3 m³ of a catalyst of the Norit_PK_2-4 type.

Figure 5:
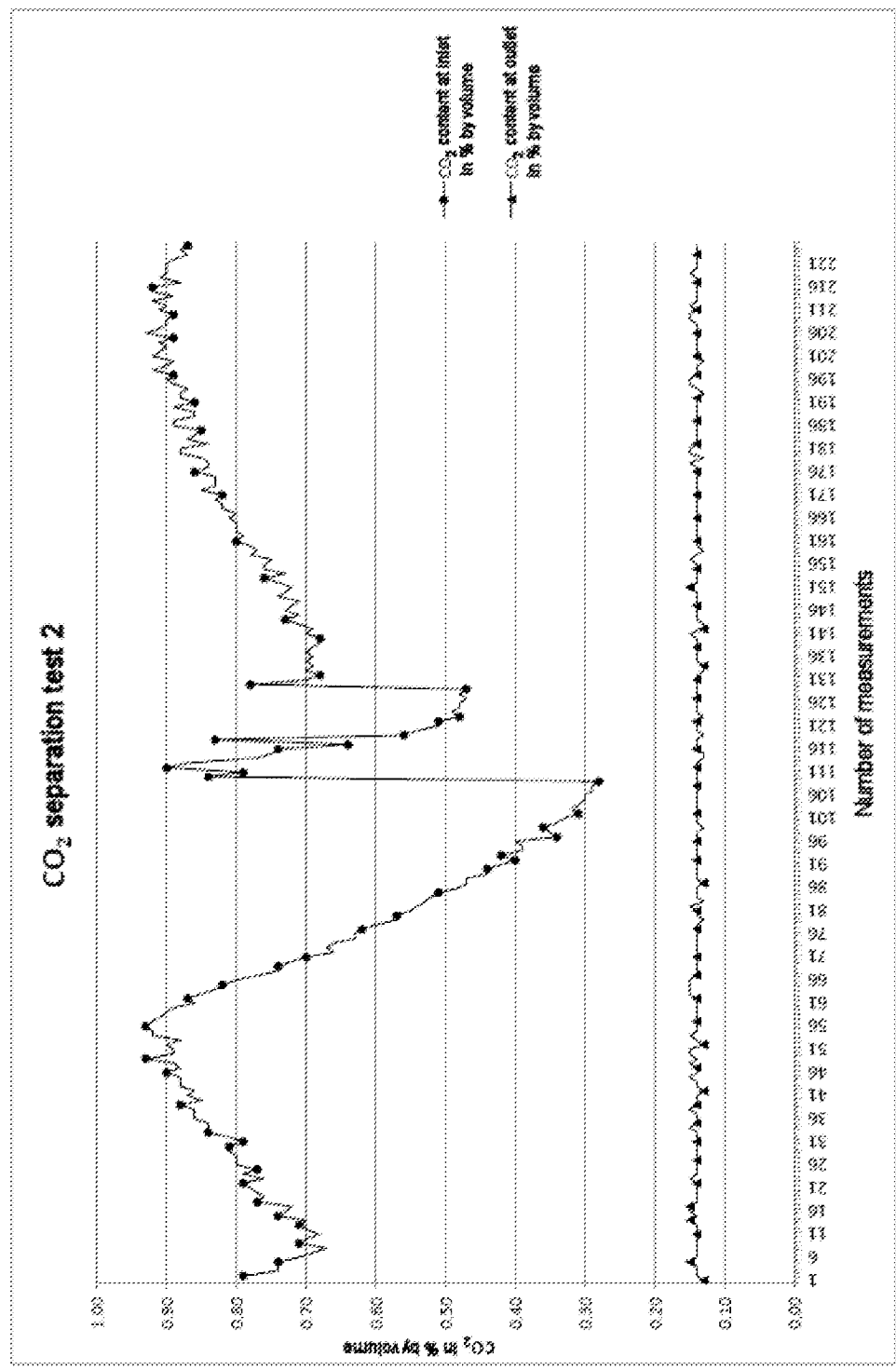
FIG. 5 is a graph showing the values measured during Test 2 of the $CO_2$ content of the waste gases at the inlet and outlet of the reactor.

In a first phase the test system was run for approximately 50 hours with the addition of SO$_2$ from gas cylinders, and in this instance between 300 and 500 ppm of SO$_2$ were added owing to the low level of catalyst filling. Overall, the reactor was charged with approximately 15 kg of SO$_2$ (approximately 50 kg of SO$_2$/m³ of catalyst). In accordance with this test, water was added anti-cyclically. Between 2 and 5 l/hour were added in 1 to 4 portions/hour, i.e. 6.6 to 16.6 l/hour/m³ of catalyst. In this instance, in contrast to the SULFACID process, no significant concentration of sulphuric acid was observed (1-2% by weight). CO$_2$ was dedusted after approximately 40 hours (approximately 40 kg of SO$_2$m³ of catalyst). The SO$_2$ and CO$_2$ content of the waste gases was measured in each case at the inlet and at the outlet of the reactor, as illustrated in FIG. I. The measurements were taken every 30 seconds and are shown in graphs in FIGS. 4 and 5. The first measurements shown in this case were taken after saturation of the catalyst, i.e. 40 hours after start-up of the reactor. The CO$_2$ concentration fluctuated repeatedly between 0.8% by volume and 0.3% by volume and it was established that the purifying values of CO$_2$ were on average more than 85%. The test was carried out continuously over approximately 2 hours. Over this entire period a nearly 100% conversion of SO$_2$ was achieved simultaneously, as can be seen from FIG. 3.

The tests which were carried out in conjunction with the invention revealed that a specific level of saturation of the catalyst with SO$_2$ must be present in order to start the CO$_2$ separation (see tests). Until this level of saturation is reached, there is no CO$_2$ separation or else only partial CO$_2$ separation with a low separation yield, as in test 1. It is assumed that the amount of O$_2$ adsorbed in this instance has a positive effect on the conversion of SO$_2$/SO$_3$ into H$_2$SO$_4$, in such a way that less SO$_2$/SO$_3$ is also released from the reactor and, where necessary, greater amounts of SO$_2$/SO$_3$ can be separated. In contrast to the SULFACID process the exothermic energy is used to separate the CO$_2$ and is not released into the aqueous covering in the bed.

An important criterion for CO$_2$ separation is the SO$_2$ purifying factor of the catalyst. This is 0.7 and 0.9 under normal continuous operation for SO$_2$ conversion into H$_2$SO$_4$ (in SULFACID operation). This also results in an acid concentration of 10-15% by weight. For CO$_2$ separation the SO$_2$ purifying factor of the catalyst is lower. The tests indicated that approximately 40-60% of the SO$_2$ is converted into H$_2$SO$_4$. This also confirms that the acid concentration in these cases is between 1 and 6% by weight.

| Key to drawing of test reactor 10: | |
|---|---|
| 10 | test reactor |
| 12 | lower part |
| 14 | upper part |
| 16 | heating device |
| 18, 20 | pressurised cylinder |
| 22, 24 | valve |
| 26 | first measuring device |
| 28 | quencher |
| 30 | waste gas fan |
| 32 | activated carbon catalyst |
| 34 | second measuring device |
| 36 | storage container |
| 38 | metering device |
| 40 | pump |
| 42 | container |
| 44 | measuring device |
| 46 | pump |
| 48 | measuring device |

The invention claimed is:

1. Method for the catalytic removal of sulphur dioxide and carbon dioxide from waste gases in a reactor charged with an activated carbon catalyst, characterised by the following steps:
   saturating the activated carbon with SO$_2$,
   saturating or partially saturating the waste gases with water,
   introducing the exhaust gases into the reactor,
   catalytically converting the SO$_2$ into H$_2$SO$_4$ and, in parallel with this, catalytically converting CO$_2$ into C and O$_2$ and into sulphur-carbon compounds on the same catalyst,
   washing out the catalyst and discharging the H$_2$SO$_4$ as a liquid and the C as a solid or/and bound to sulphur compounds.

2. Method according to claim 1, characterised in that the ratio of SO$_2$ and CO$_2$ in the waste gases is between 0.25 and 0.58 mol/mol.

3. Method according to claim 1, characterised in that the inlet temperature of the waste gases lies between the ambient temperature and 150° C.

4. Method according to claim 1, characterised in that the O$_2$ content of the waste gases is at least 5% by volume.

5. The method according to claim 1, characterised in that the O$_2$ content is more than 8 times greater than the SO$_2$ content.

6. Method according to claim 1, characterised in that the waste gases are saturated with water by quenching.

7. Method according to claim 1, characterised in that softened or demineralised water is used to wash out the catalyst.

8. Method according to claim 1, characterised in that the catalyst is washed out in co-current flow with or in counter-flow to the waste gases.

9. Method according to claim 1, characterised in that the SO$_2$ purifying factor of the catalyst is between 0.4 and 0.6.

* * * * *